(12) United States Patent
Michaeli et al.

(10) Patent No.: US 6,422,576 B1
(45) Date of Patent: Jul. 23, 2002

(54) TRANSPORT MECHANISM

(75) Inventors: Gil Michaeli; Avishay Novoplanski, both of Jerusalem (IL)

(73) Assignee: Galileo Mobility Instruments Ltd., Kfar Truman (IL)

( * ) Notice: Subject to any disclaimer, the term of this patent is extended or adjusted under 35 U.S.C. 154(b) by 0 days.

(21) Appl. No.: 09/530,134

(22) PCT Filed: Oct. 22, 1998

(86) PCT No.: PCT/IL98/00515

§ 371 (c)(1),
(2), (4) Date: Jun. 28, 2000

(87) PCT Pub. No.: WO99/21749

PCT Pub. Date: May 6, 1999

(30) Foreign Application Priority Data

Oct. 29, 1997 (IL) ................................. 122062

(51) Int. Cl.⁷ ............................. B62B 5/02; B62D 55/00
(52) U.S. Cl. ............................. 280/5.22; 280/DIG. 10; 180/9.32; 305/6; 305/7
(58) Field of Search ................................. 305/6, 7, 157, 305/60, 165; 280/5.2, 5.22, DIG. 10; 180/9.32, 218

(56) References Cited

U.S. PATENT DOCUMENTS

| | | | | |
|---|---|---|---|---|
| 3,179,431 A | * | 4/1965 | Pikl | 280/5.2 |
| 3,198,534 A | | 8/1965 | Porter | 280/5.22 |
| 3,226,129 A | * | 12/1965 | McKinley | 280/5.2 |
| 5,492,390 A | * | 2/1996 | Kugelmann, Sr. | 305/6 |
| 5,676,215 A | * | 10/1997 | Misawa | 180/9.32 |

FOREIGN PATENT DOCUMENTS

FR 1.181.920 6/1959

OTHER PUBLICATIONS

Patent Abstracts of Japan, "Crawler Vehicle" Publication No. 60047771, Pub. Date Mar. 15, 1985, European Patent Office.
Patent Abstracts of Japan, "Crawler Type Traveling Car" Publication No. 60139576, Pub. Date Jul. 24, 1985, European Patent Office.

* cited by examiner

Primary Examiner—Brian L. Johnson
Assistant Examiner—Matthew Luby
(74) Attorney, Agent, or Firm—Nath & Associates PLLC; Gary M. Nath; Marvin C. Berkowitz (57) ABSTRACT

A transport mechanism (104) for transporting a load-assembly (102), the transport mechanism comprising a closed flexible track (106) supported at an internal side thereof by at least two support rollers (108, 110), which at a first position one of the support rollers (108) exerts a force having a downward component onto the flexible track (106) at a point of contact thereof with a ground surface and biasing arrangement for biasing said flexible track (106) so as to assume a substantially circular shape. A displacing mechanism (112) is coupled to at least one of the support rollers for mutually displacing the support rollers into a second position, against the biasing arrangement in which the support rollers force the track to assume a state in which an extended portion (122) thereof is in contact with the ground surface and at least two of the support rollers are positioned at two ends of the portion.

14 Claims, 14 Drawing Sheets

TRANSPORT MECHANISM

FIELD OF THE INVENTION

The present invention relates to a transport mechanism. More specifically, the present invention relates to a transferred mechanism adaptable for different terrains and to pass over various obstacles. Such a transport mechanism is useful in a large variety of vehicles. In the following, the term "vehicle" will be used to denote any mobile device making use of wheels or close tracks for transport including cars, trucks, hand trucks, wheelchairs, vehicles dedicated for specific applications, etc.

BACKGROUND OF THE INVENTION

A very wide variety of transport mechanisms are known. On the one extreme are wheels, which are characterized by a minimal contact with the ground, and hence minimal friction or drag develops with the surface over which the vehicle tracks, and on the other extreme are chains and belts which contact the ground over a relatively large surface, and hence have a large drag. Wheels are adapted for transport over essentially solid surfaces, whereas chains are intended far use on rough or loose ground terrains, such as soil or snow, or for overcoming different obstacles.

The transport mechanism of a vehicle is designed according to the terrain or the type of surface for which the vehicle is intended. However, at times, the vehicle is confronted with terrains different than that to which it is designed, or has to overcome various obstacles. For example, field vehicles which are at times provided with regular, air field rubber wheels, have an installation allowing deflating of the wheels in order to increase surface grip, e.g. when passing in an area with loose or muddy ground.

Wheelchairs are typically provided with a wheel, which is either hand or motor-powered, which allows safe transport of handicapped individuals over flat and hard surfaces. However, there is a serious problem in transporting a wheelchair over various obstacles, e.g. such as the edge of a sideboard, stairs, etc., as well as to transport a wheelchair over unpaved ground or snow.

It is the object of the invention to provide a novel transport mechanism which is versatile in that it can be configured to transfer a vehicle, such as a wheelchair, over different terrains, to allow it to safely pass over various obstacles, etc.

GENERAL DESCRIPTION OF INVENTION

The present invention provides a transport mechanism for transporting a load-bearing assembly, said transport mechanism comprising:

a closed flexible track supported at an internal side thereof by at least two support rollers, which at a first position one of the support rollers exerts a force having a downward component on to the flexible track at a point of contact thereof with a ground surface;

biasing arrangement for biasing said flexible track so as to assume a substantially circular shape; and a displacing mechanism couple to at lest one of said support rollers for manually displacing the support roller into a second position, against said basing arrangement, in which the support rollers force the track to assume a state in which an extended portion thereof is in contact with the ground surface and at least two of said support rollers are positioned at two ends of said portion.

In accordance with one embodiment of the invention, the transport mechanism is motor operated, in accordance with this embodiment at least one of the support rollers are coupled to a motor and the flexible track is engaged with said at least one support rolling for imparting rotary motion to said track.

In accordance with one preferred embodiment of the invention, the transport mechanism is a transport mechanism of a wheelchair.

The load-bearing assembly may be, for example, a setting unit of a wheelchair, a platform in a hand truck, a body of a vehicle, etc.

It should however be noted that the invention is not limited to this embodiment, as will also be illustrated further below.

In accordance with a embodiment of the invention, said flexible track is made of a resilient material with stiff and springy reinforcement wire embedded therein for biasing the flexible track to assume its essentially circular shape.

In accordance with another embodiment, the flexible track is made of a resilient material with stiff radial projections from the internal side of the flexible track, each of the projections being connected to adjacent projections by resilient linking elements for biasing the flexible track to assume its substantially circular shape. A track in accordance with this embodiment may be made of a continuous flexible body, or alternatively, may consist of a plurality of segments pivotally connected to one another.

In accordance with still another embodiment, a first of the at least two support rollers is mounted at an end of a first arm, and a second of the at least two support rollers is mounted at an end of a second arm displaceable with respect to the first arm. At a first state of the mechanism the first and the second support rollers are positioned at opposite ends of a line defining the diameter of the circular shape; at a second state the first and second support rollers are positioned such that they are in contact with the track at portions thereof which contact the ground.

The load-bearing assembly may be connected directly to one or more of the support rollers. Alternatively, the load-bearing assembly is connected to the displacing mechanism of the transport assembly. In the latter case, the load-bearing assembly may be associated with a mechanism for angular displacement of the load-bearing assembly with respect to the displacing mechanism responsive to position and inclination of the flexible track so as to retain a stable center of gravity.

In accordance with one embodiment of the invention, the load-bearing assembly is associated with a mechanism for maintaining it at an essentially horizontal position, regardless of the position and inclination of the flexible track.

In accordance with still a further embodiment of the invention, the flexible track consists of two sets of identical links, each link having a first and a second face, a first and second radial edge, a peripheral edge forming part of the track's periphery and an internal edge; the links of each set being arranged in a closed path with the first radial edge of each link facing and being adjacent the second radial edge of an adjacent link, and with the first faces of links of one set facing the first faces of links of the other set; each link of one set being pivotally linked at a first corner thereof defined by the first radial edge and by the peripheral edge with the first corner of one link of the second set, and pivotally linked at a second corner thereof, defined by the second radial edge and by the internal edge with the second corner of a link of the other set adjacent said one link; there being a biasing member biasing each link to converge with respect to the adjacent links.

In accordance with another embodiment, the flexible track consists of a plurality of identical segments connected to one another by links; each segment having a peripheral edge forming part of the track's periphery, an internal edge and two side edges, the side edges being inclined such that when the track assumes its circular shape, side edges of adjacent segments are in contact with one another; the segment being connected to the links at corners formed between the peripheral and side edges in a slidable and pivotal manner; the track further comprising one or more biasing members biasing segments towards one another. Such biasing members may be a resilient strap or a non-resilient strap which is manually tensioned to apply the biasing force on the segments for assuming the circular shape of the track.

According to still another embodiment of the present invention one of the support rollers is mounted on a first arced rail and another of the support rollers is mounted on a second arced rail co-axial with the first arced rail, said arced rails being mutually slidably displaceable with respect to one another so as to displace the respective support rollers between the first and second positions.

By a further aspect the present invention also provides a track for use in the above transport mechanisms with specifications as defined.

The invention will now be illustrated in a non-limiting manner in the following specific embodiments with reference to the annexed drawings:

DETAILED DESCRIPTION OF PREFERRED EMBODIMENTS

Figure 1:
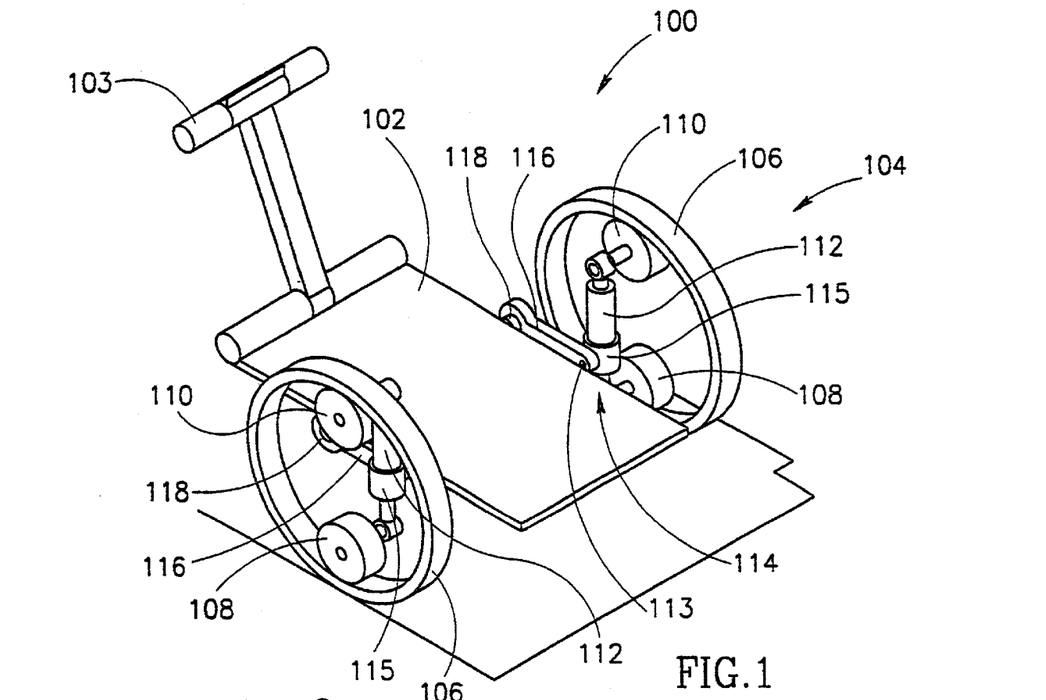
FIG. 1 shows a transport mechanism, in accordance with one embodiment of the invention, fitted on a hand truck.

Reference is first being made to FIG. 1 showing a vehicle 100, which in this specific embodiment is a hand truck, which comprises a load-bearing assembly 102 fitted with a control handle 103 and a transport mechanism 104 in accordance with the embodiment of the invention. As will be appreciated from the description below, a hand truck, is only but one example, of a vehicle which can be fashioned with a transfer mechanism of the invention, other examples being a car, truck, wheelchair, motorcycle, lift trucks, snow vehicles, etc.

The transport mechanism 104 comprises a closed track 106 supported by support rollers 108 and 110 rotatably mounted at opposite ends of a telescopic arm 112, which provides a biasing force pushing the support rollers away from one another. Arm 112 is pivotally connected to a displacing mechanism 114 which consists of a displacing arm 116 pivotally connected to the load-bearing assembly 102 and can be selectively rotated by the user about pivot 118. Track 106 is flexible, but has intrinsic biasing arrangement for biasing it into its circular shape, such as steel bands or wires (not seen), similarly as in conventional tires, embedded within the flexible material of the track. In addition, the biasing arrangement may be any one of the embodiments of such arrangements to be described further below, as well as many others.

In the position of the displacing mechanism shown in FIG. 1, arm 112 has a vertical position whereby support roller 108 bears on the track at its lowermost portion which is in touch with the ground, and support roller 110 bears on the track at its uppermost portion. In this position drag on the transport mechanism is minimal, whereby the vehicle rolls smoothly over the ground surface.

Figure 2:
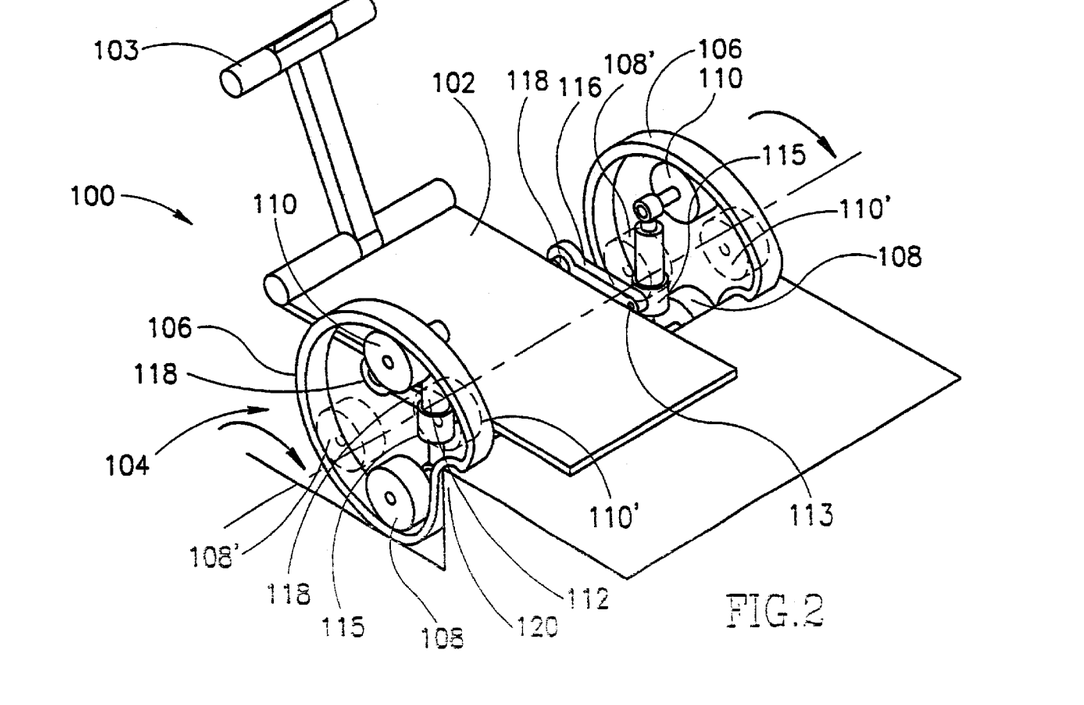
FIG. 2 shows the sport mechanism of the embodiment of FIG. 1 upon encountering an obstacle such as a stair.

As can be seen in FIG. 2, the flexible nature of track 106 allows it to easily overcome obstacles such as a step 120. When approaching the step, the track flexes to a shape dictated by the shape of the obstacle. Preferably, the displacing mechanism 114 is activated, either manually or automatically, either by rotation of arm 116 about pivot 118 or by rotation of arm 112 around pivot 115 into positions 108' and 110', respectively, represented in FIG. 2 by dashed lines. In this position, support roller 110 is already on top of step 120 and support roller 108' is in a position whereby it does not hinder the overcoming of this obstacle.

It will be appreciated by the artisan that the displacing mechanism may be provided with motors for assisting in displacing the transport mechanism between positions, such motors may be, for example, electric, hydraulic or pneumatic and may be associated with suitable activating and control means as known per se.

Figure 3:
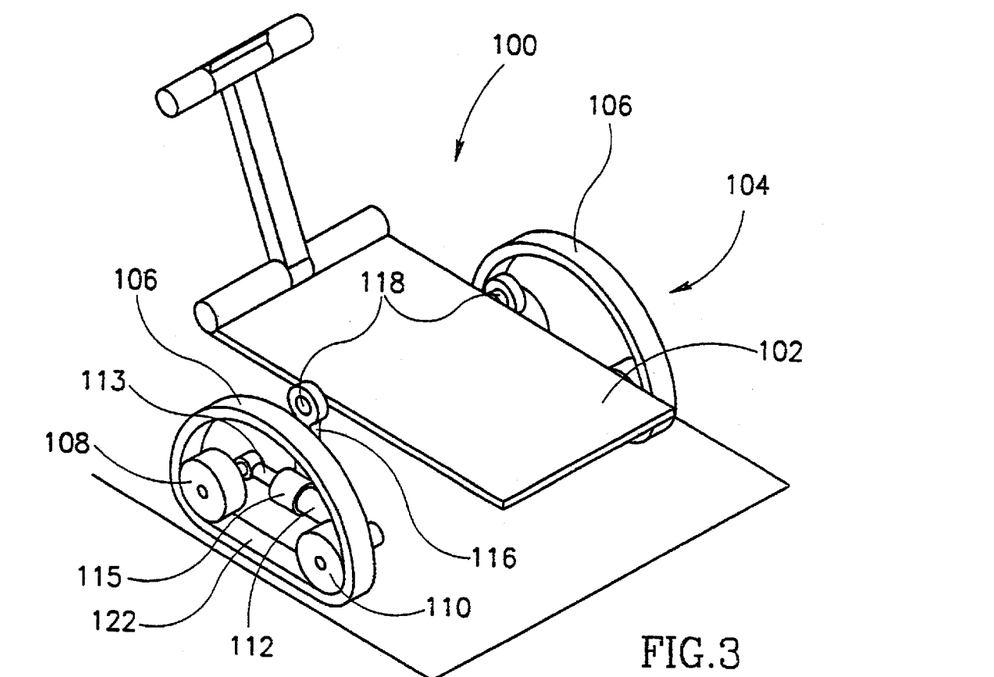
FIGS. 3 and 4 show the embodiment of FIG. 1 in two different states of the track in which it has an extended portion in contact with the ground surface
Figure 4:
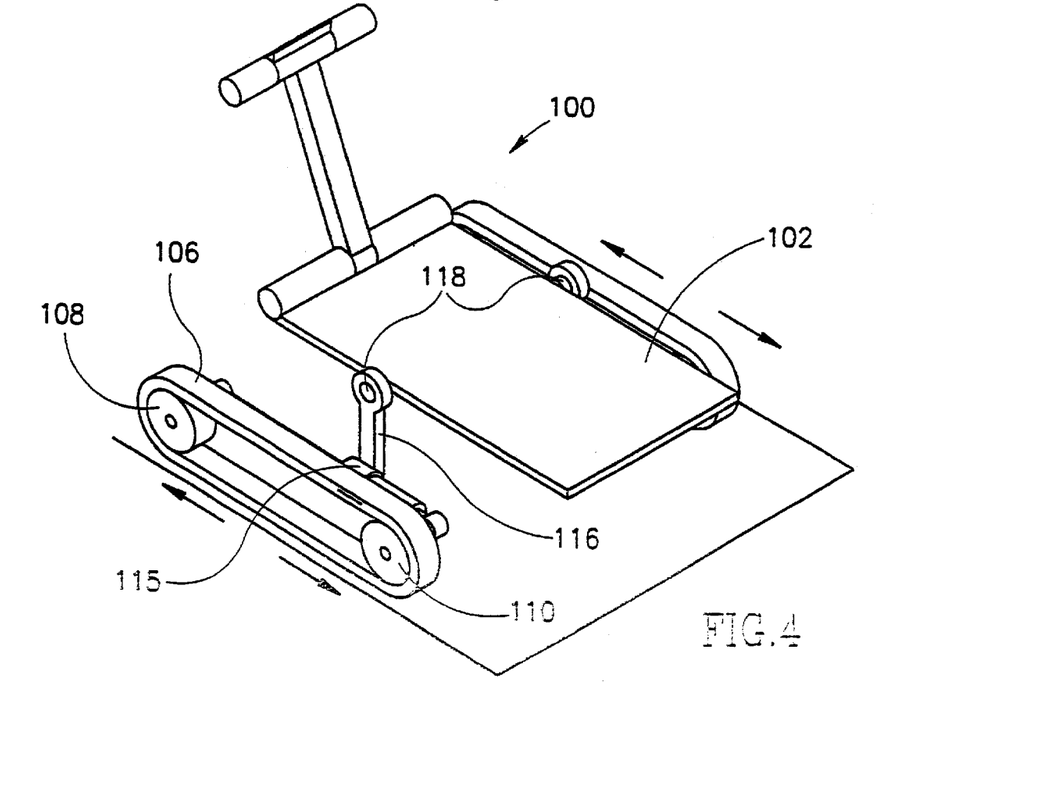

FIG. 3 illustrates vehicle 100 in a different state of transport mechanism 104. In this state, arm 116 is rotated by 90° about pivot 118, whereby arm 112 is horizontal, such that support rollers 108 and 110 are horizontal, each bearing on track 106 at two ends of an extended portion 122 which is in contact with the ground surface. By extension of rod 113 of arm 112, the two support rollers 108 and 110 bias track 106 into a position shown in FIG. 4 to assume a fill track state. In this state, the contact with the ground surface is maximal. While the state shown in FIG. 1 is useful for transport over solid and even surfaces, the states shown in FIGS. 3 and 4 are suitable for transport over an uneven or loose terrains, as well as to overcome various obstacles such as climbing or descending over a flight of stairs, as will be illustrated below, etc.

Figure 5:
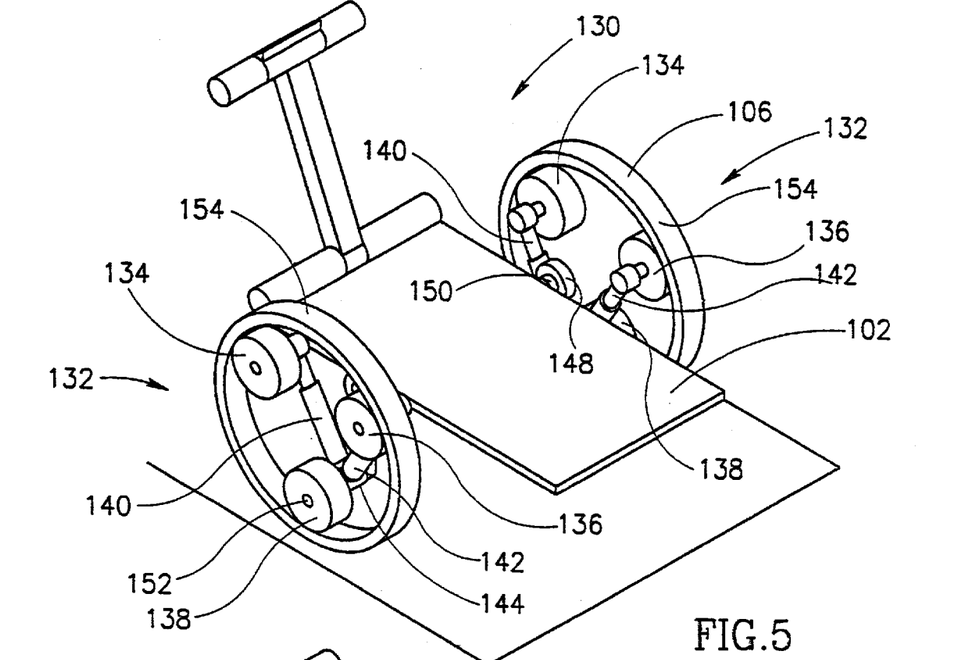
FIG. 5 shows another embodiment of a transport mechanism, with the track in its circular shape, when the mechanism has three support rollers.

A transport vehicle 130 which for the sake of illustration is a hand-truck, is shown in FIG. 5. This vehicle has essentially the same load-bearing assembly 102 as in the embodiment of FIG. 1, but different therefrom by having a different transport mechanism 132. In this case, transport mechanism 132 comprises three support rollers 134, 136 and 138. Support roller 134 is at an end of a first telescopic arm 140 and support roller 136 is at an end of a second telescopic arm 142, with the two telescopic arms being pivotally connected at 144 to a pivot extending at an end 146 of displacing arm 148 (best seen in FIG. 6), similar to arm 116 of the embodiment of FIG. 1, which is pivotally connected at 150 to load-bearing assembly 102. Support roller 138 is rotatable about an axis 152, coaxial with axle 144.

In the state shown in FIG. 5, the track 154, which may be similar to track 106 of the embodiment shown in FIGS. 1–4, has a circular shape, and each of the support rollers 134, 136 and 138 bears on track 154, at different points thereof, with support roller 138 bearing at a point of contact of track 154 with the ground. The vehicle 130 has a displacing mechanism allowing to pivotally diverge the arms 140 and 142 away from one another, into a position shown in FIG. 6 wherein there are essentially aligned on one straight line, and consequently track 154 assumes, as can be seen, a full track position, in which a large portion engages the ground surface. This position is useful in riding over loose terrain or for tracking over flights of stairs, in which case the transport vehicle 130 will further comprise a mechanism for retaining the load-bearing assembly 102 at an essentially horizontal position, or at any other angle or keep the center of gravity fixed, regardless of the angular position of the transport mechanism. It is appreciated that a skilled person is familiar with such mechanism as well as their construction and operation.

Figure 6:
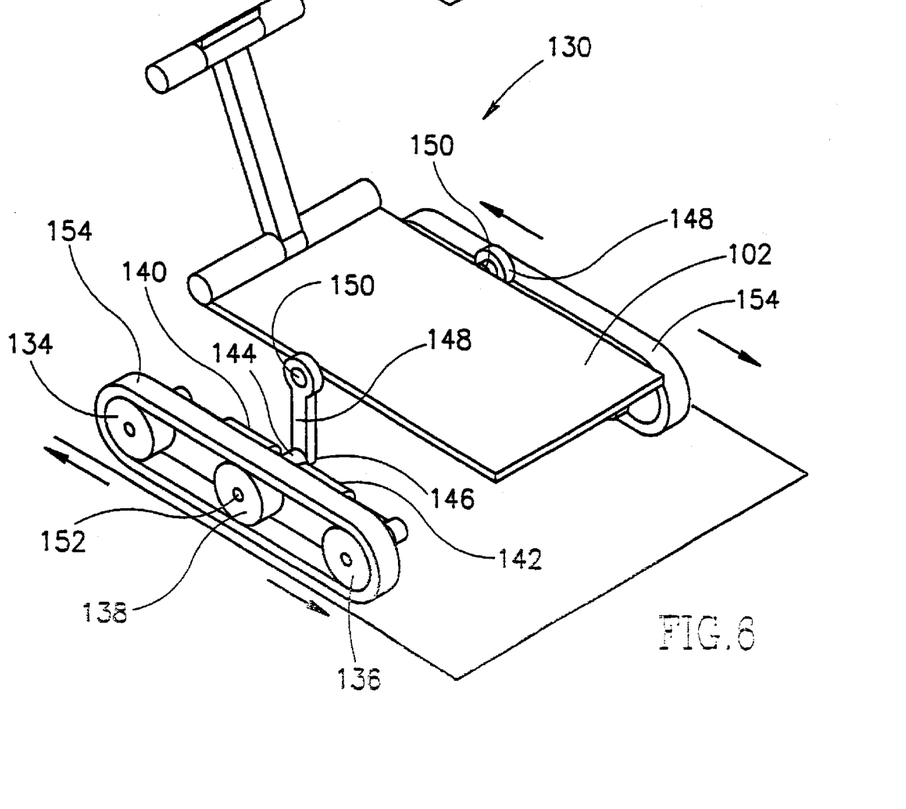
FIG. 6 shows the transport mechanism of FIG. 5 in a different state.
Figure 7:
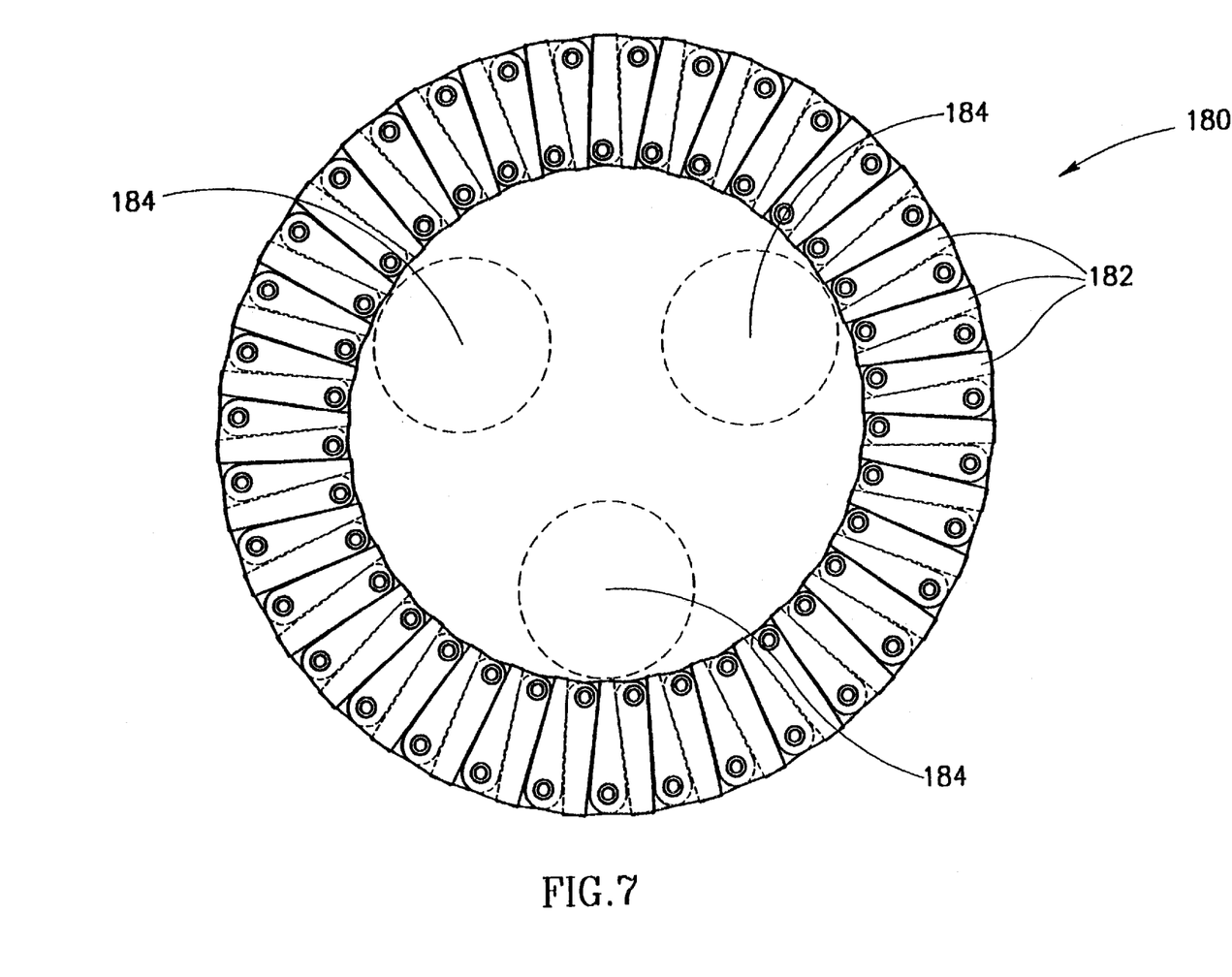
FIG. 7 is a side elevation of a specific embodiment of a track in accordance with the invention, shown in its circular state.
Figure 8:
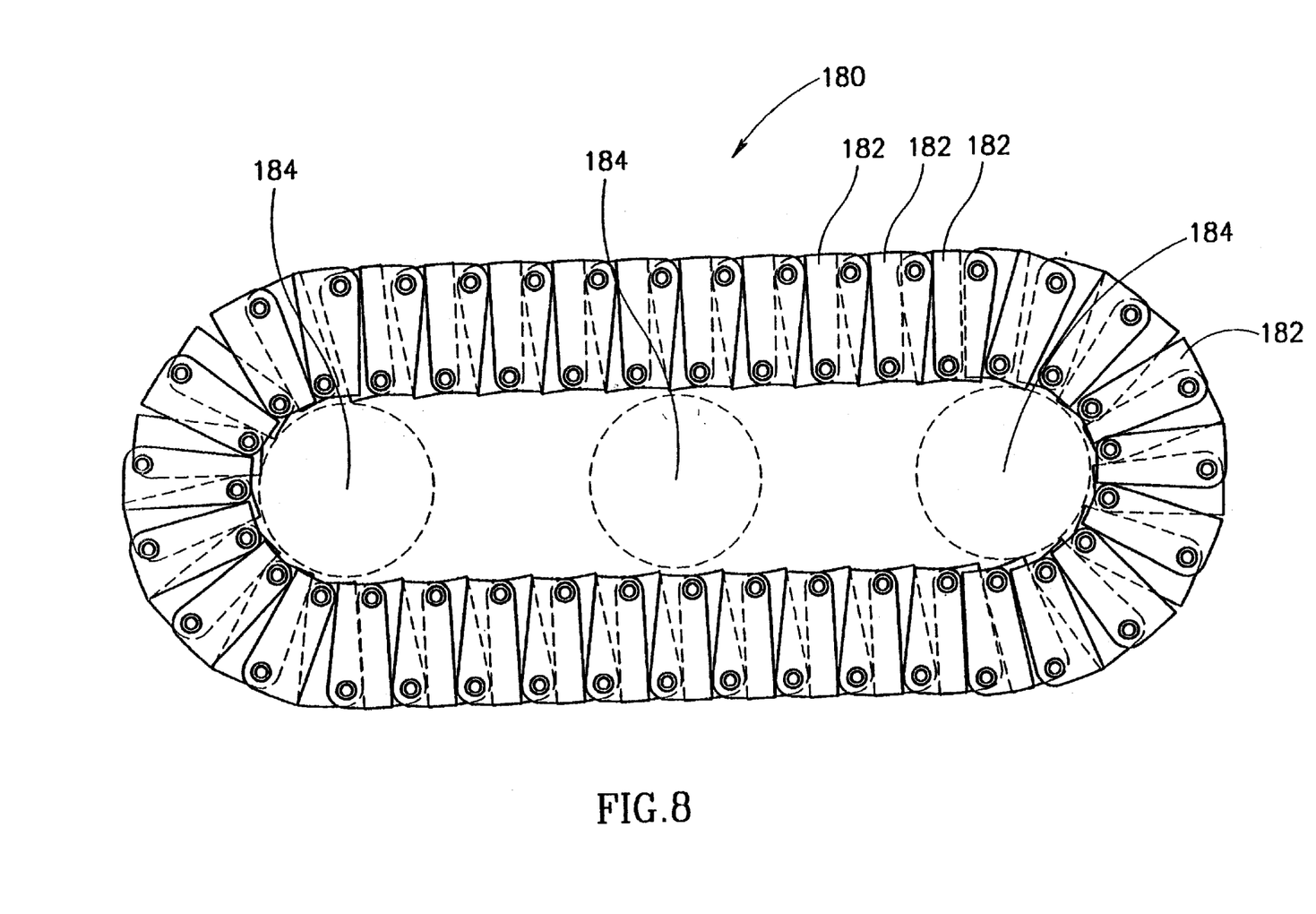
FIG. 8 shows the track of the embodiment of FIG. 7 in a state in which it has an extended portion in contact with the ground surface.

FIG. 7 shows a flexible track 180 according to an embodiment of the invention. The track according to this embodiment is made of a plurality of links 182 and the flexibility, and the bias to assume a circular shape is imparted by the manner in which the links are connected to one another, as will hereinafter be explained with reference to FIGS. 9 and 10. The state of the track as seen in FIG. 7, corresponds to that of track 106 as seen in FIG. 5, with the support rollers 184, supporting the track in its circular position. The support rollers may however be displaced into the position shown in FIG. 8, which corresponds to that of track 106 as seen in FIG. 6, with a maximal portion of the track being in tact with the ground.

Figure 9:
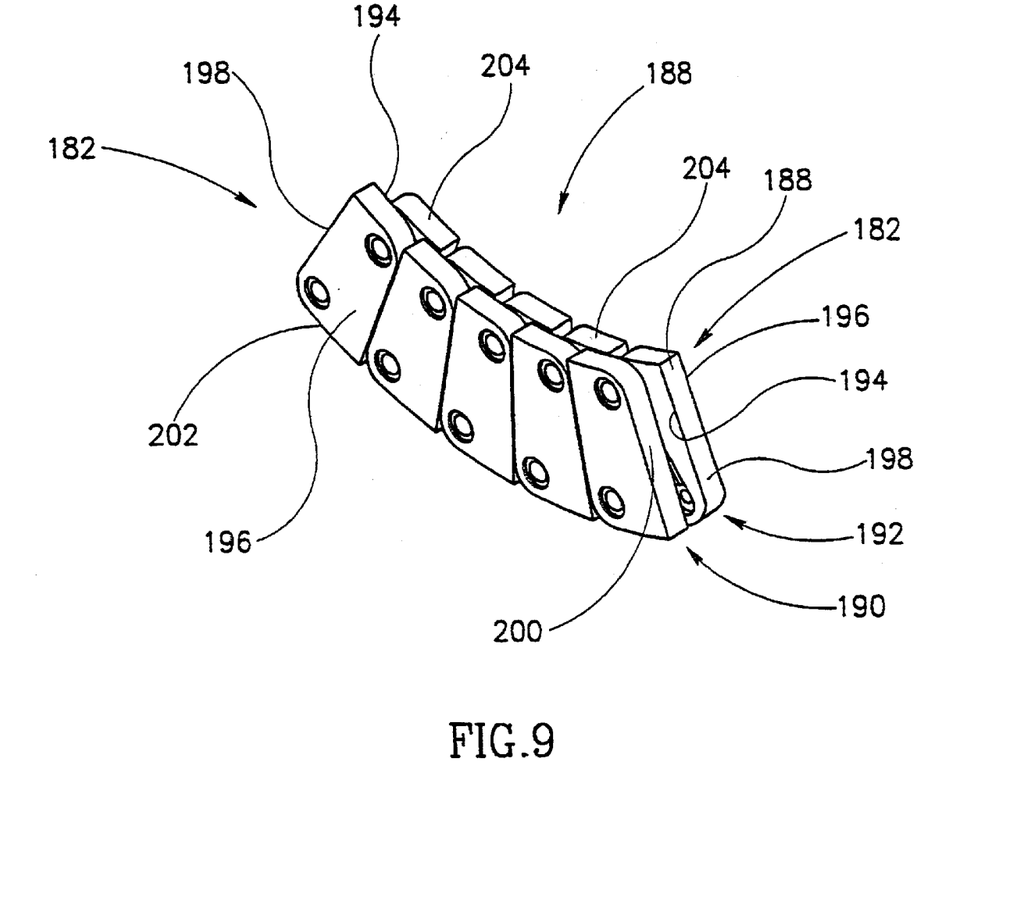
FIG. 9 is an isometric view of a portion of the track of the embodiment of FIGS. 7 and 8 in the state shown in FIG. 7.
Figure 10:
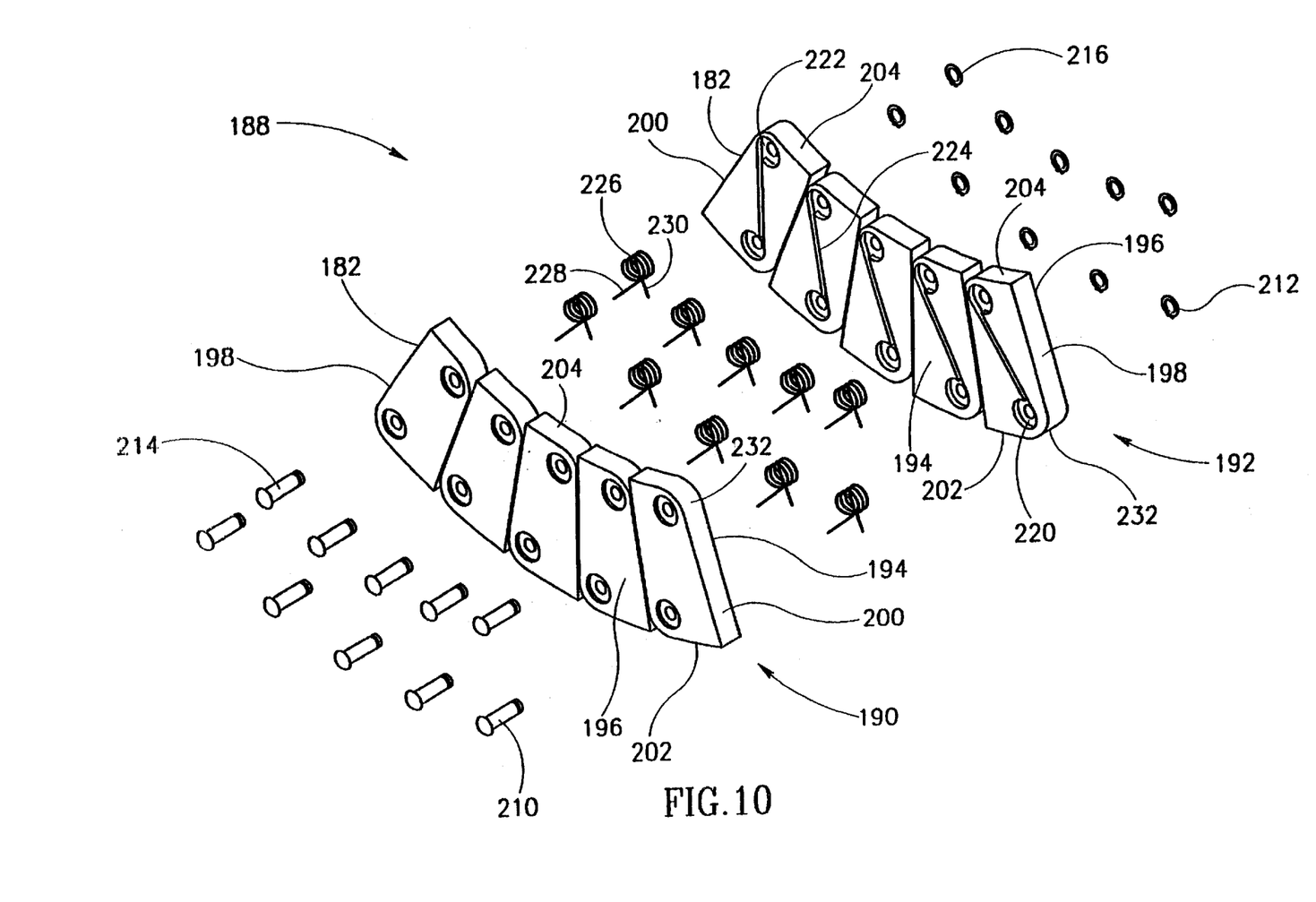
FIG. 10 is an exploded view of the section of FIG. 9.

For better understanding of the manner of construction of track 180, reference is made to FIGS. 9 and 10 which show a portion 188 of the track in an assembled and in an exploded view, respectively.

The links are arranged in two sets, a first set 190 and a second set 192. The links in both sets are identical. Each link has a first face 194 and a second face 196, with the first faces of links of the two sets facing one another. Each link has further a first radial edge 198, a second radial edge 200, a first radial edge of one link facing and being adjacent a second radial edge of another link and further comprising a peripheral edge 202 and an internal edge 204.

Each link of one set is pivotally linked at a first corner thereof which is defined by edges 198 and 202 to the corresponding corner of a link of the second set, by means of pivot pins 210, which is retained at the other end by washers 212. Each link is further pivotally linked at a second corner thereof defined by edges 200 and 204, with the corresponding corner of a link in the other set, adjacent the link to which it is pivotally linked at its other corner, which linking is by means of pins 214, and washes 216, which may be the same or different than pins 210 and washers 212, respectively.

Formed within the first faces at the aforementioned corners of each link are circular recesses 220 and 222, connected by a groove 224. Provided is also a helical spring 226 with two end arms 228 and 230, with the spring being fitted into recesses 220 and 222, coaxial with pins 210 and 214, with their arms 228 and 230 fitting into grooves 224 of the two facing links. The springs are preferably pre-tensioned such that they provide a biasing converging force on the two links with which they are associated. Consequently, the track is biased to a close proximity of the links to one another, as can be seen in FIG. 9, whereby it assumes a circular shape seen in FIG. 7.

As can be seen, each of the aforementioned corners has a trimmed and curved corner edge which facilitates smooth pivotal movement.

Figure 11:
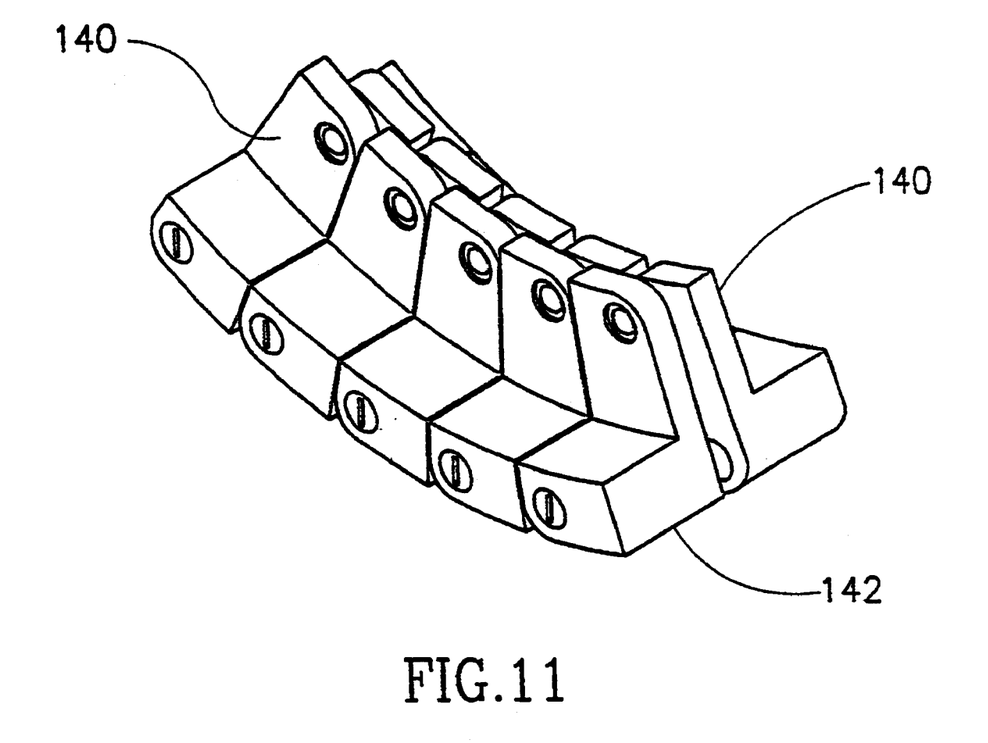
FIG. 11 is an isometric view of a segment of a track in accordance with another embodiment.
Figure 12:
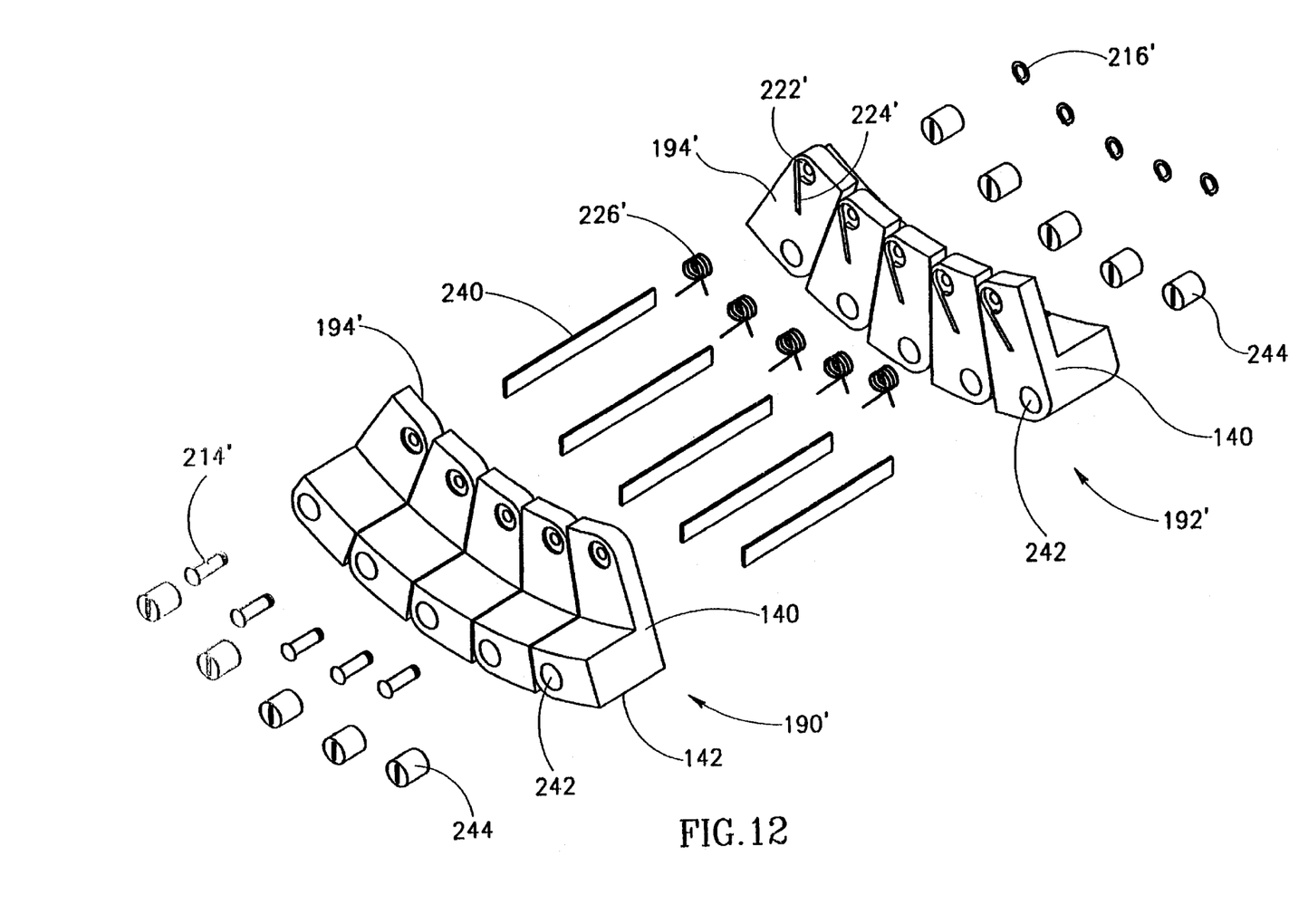
FIG. 12 is an exploded view of the segment of FIG. 11.

An alternative embodiment similar to that of FIGS. 7–10 can be seen in FIGS. 11 and 12. The main difference in these embodiments reside in that each of links 140, rather than having a planar shape, has an L-like cross-sectional shape, allowing cooperation with a grooved support roller or with two support rollers coupled to one another, and further the outer face 142 can be better fitted with a rubber friction or ground retaining band.

Another difference from the embodiments of FIGS. 7–11 can be seen in FIG. 12. Some elements are identical and have the same function to those which can be seen in FIG. 10, and were accordingly given like numbers with a prime indication. The linking arrangement between links of the different sets 190' and 192' makes use of a torsion strip 240, which is inserted into bores 242 and is received at each of its ends by a connector 244 snugly received within bores in a manner not enabling its rotation. The torsion of this strap provides the biasing force biasing the two opposite links towards conversion one with respect to the other. One advantage of this arrangement over that of the spring is that it can replaced without need to disassemble the track.

A track in accordance with another embodiment can be seen in FIGS. 13–16. The track 150 of this embodiment has a plurality of trapezoidal segments 152 linked to one another at their peripheral corners by links 154, each defining an elongated opening 156 which receives pins 158 of opposite corners of adjacent links. In this manner, each two adjacent links can change the distance and the angle one with respect to the other.

Also provided is a flexible tension band 160 which is retained by and biased against a set of pins 162 at inner corners of segments 152. Also provided is a tensioning mechanism for tensioning band 160 which can either be an intrinsic flexibility of the band, or an extrinsic tensioning arrangement, such as key 166 which turns tensioning wheel 168 over which an end of band 160 is wound. The other end of band 160 is firmly fitted, e.g. to one of pins 162.

Figure 13:
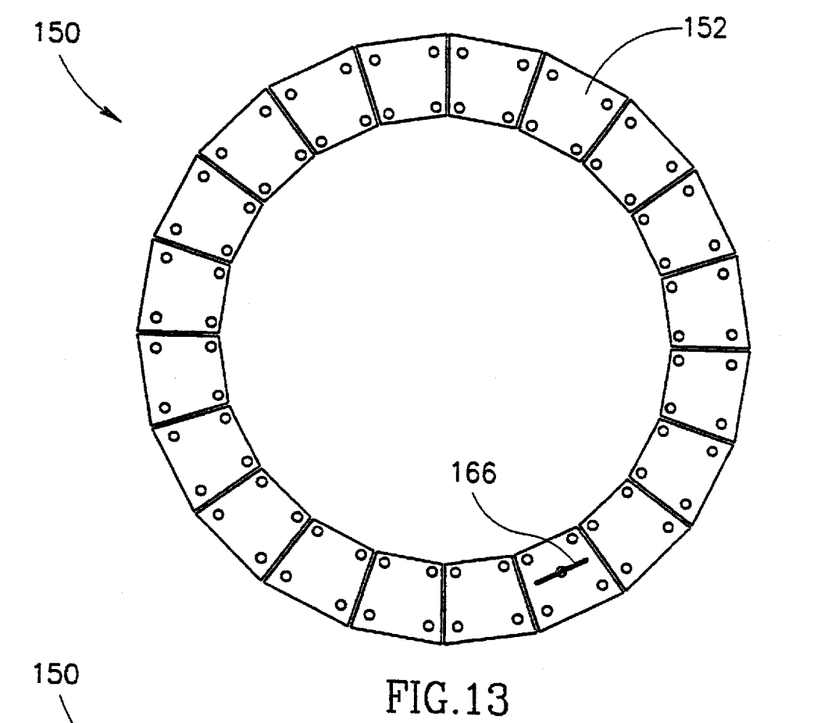
FIG. 13 is a side elevational view of a track in accordance with another embodiment of the invention, shown in a circular state.
Figure 14:
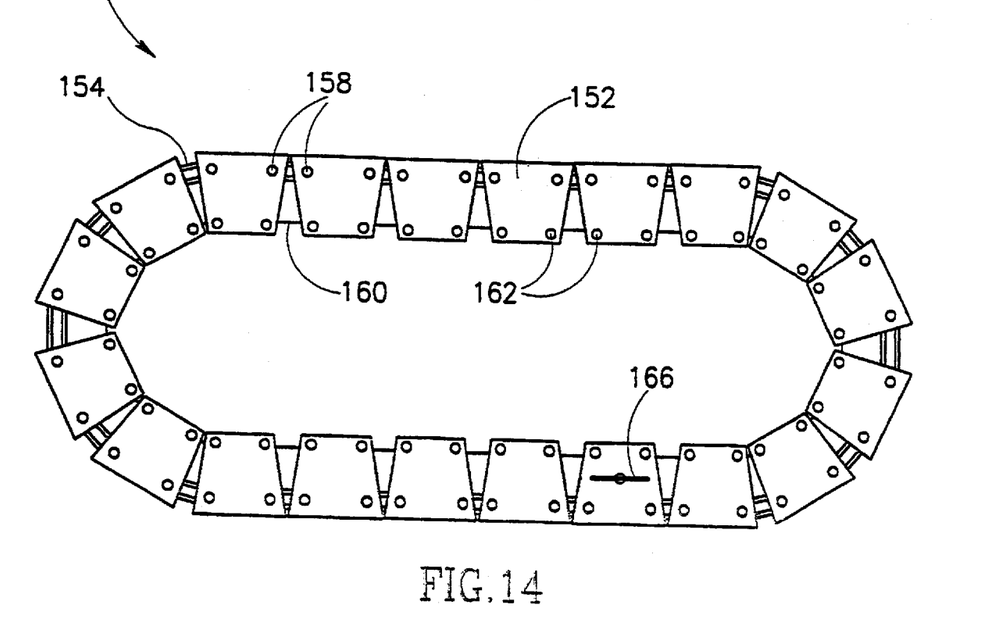
FIG. 14 shows the track of FIG. 13 in a different state.
Figure 15:
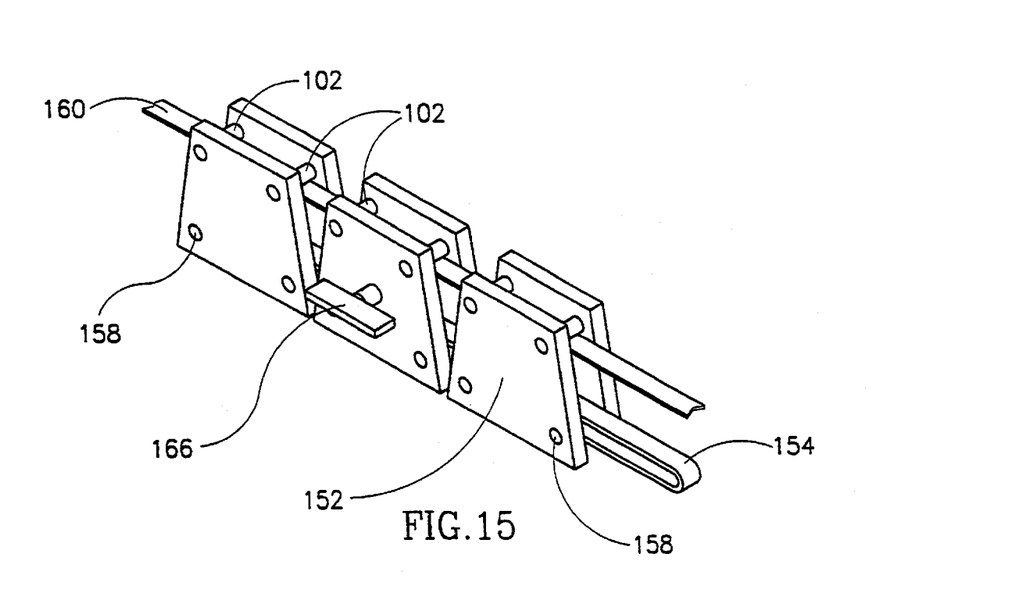
FIG. 15 shows a segment of the track of the embodiment of FIGS. 13 and 14, in the state of FIG. 14.
Figure 16:
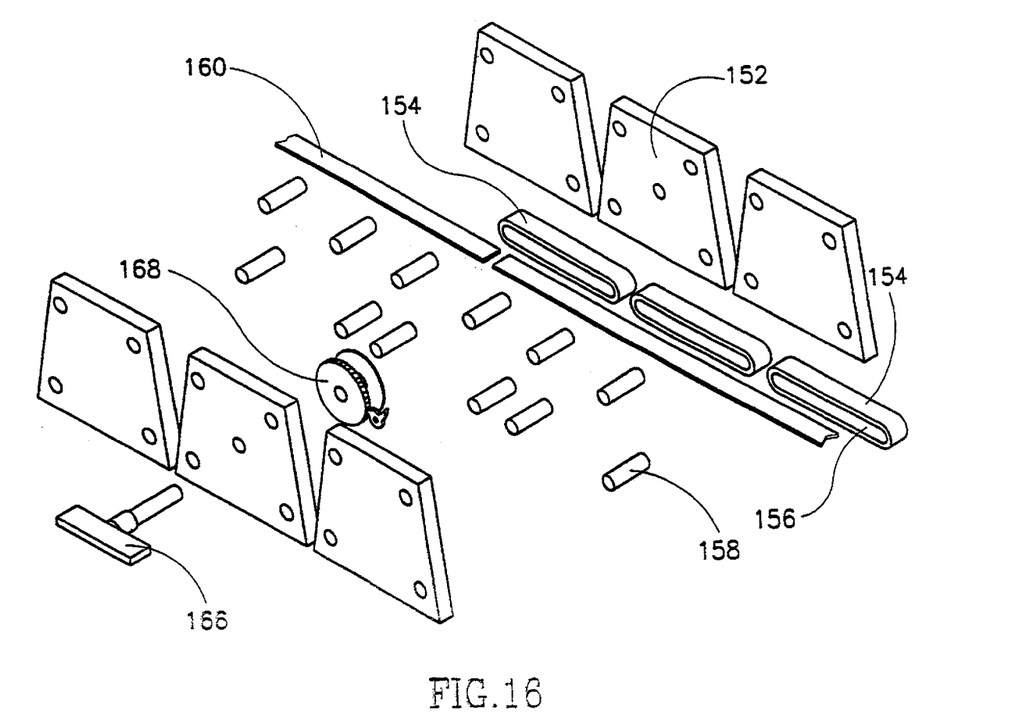
FIG. 16 is an exploded view of a segment of FIG. 15.

As can be seen again in FIG. 13, by releasing band 160, the track can be formed from its circular state shown in FIG. 13, to its extended state shown in FIG. 14.

Figure 17:
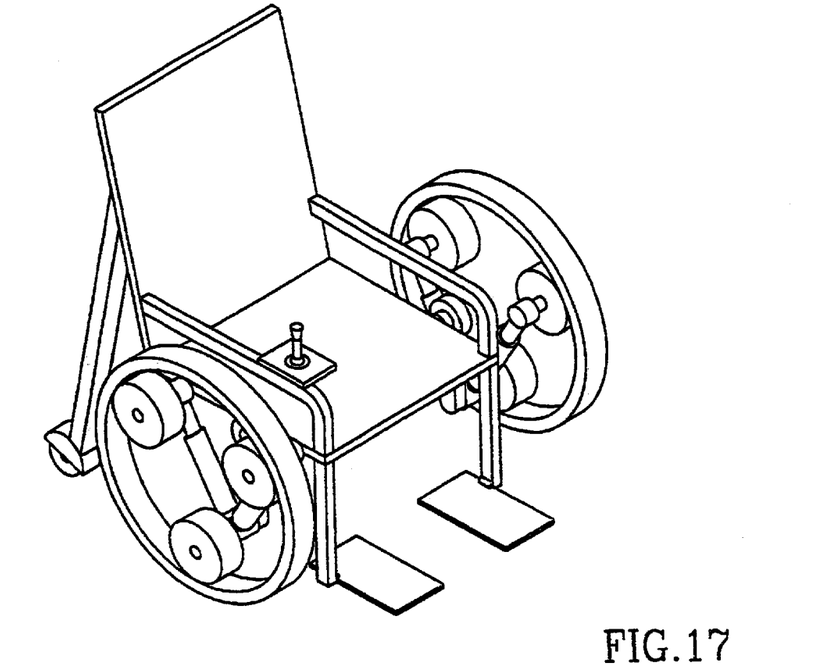
FIG. 17 is an isometric view of a wheelchair fitted with a transport mechanism in accordance with the invention, with the transport mechanism in a first state.
Figure 18:
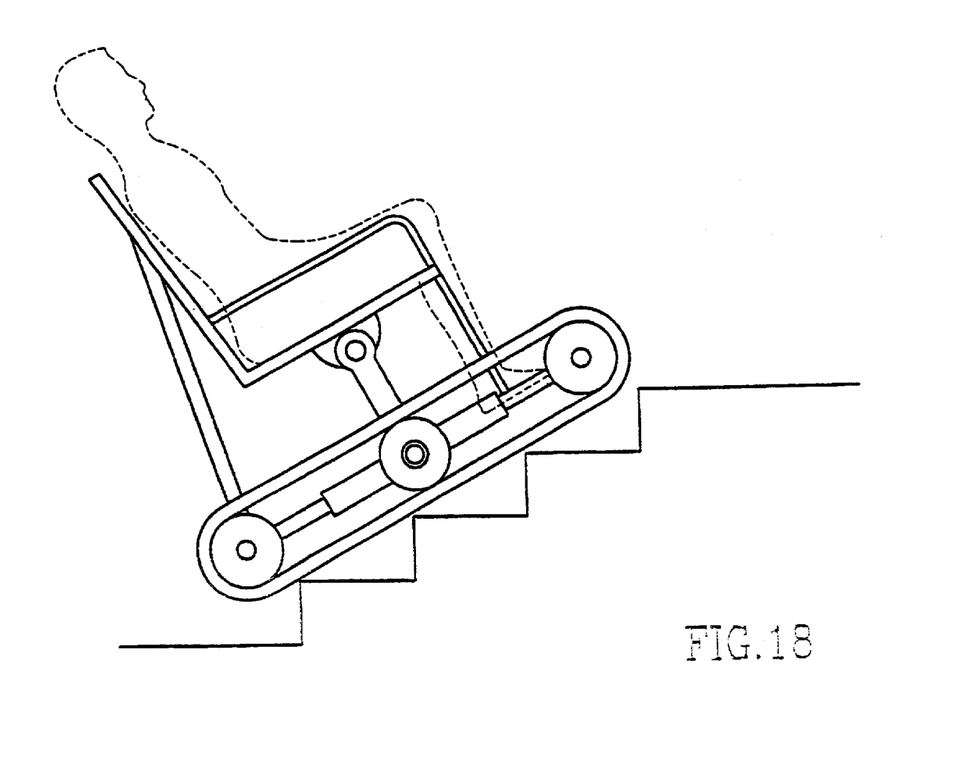
FIG. 18 shows the wheelchair of FIG. 17 in a second position while ascending a flight of stairs.

A wheelchair 180 fitted with a transport mechanism 182 can be seen in FIG. 17. The state shown in FIG. 17 is similar to that of the embodiment shown in FIG. 5. Similarly as in the case of the embodiment of FIG. 5, the transport mechanism can assume an extended state, which can be seen in FIG. 18 allowing the wheelchair to better ascend or descend a flight of stairs 184, as well as to pass over a variety of uneven terrains.

Figure 19:
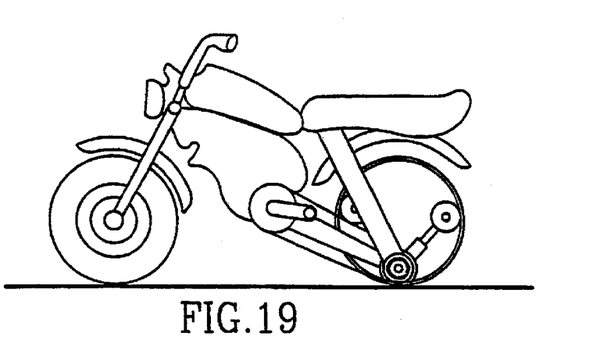
FIG. 19 shows a motorcycle fitted at its back with a transport mechanism in accordance with the invention.
Figure 20:
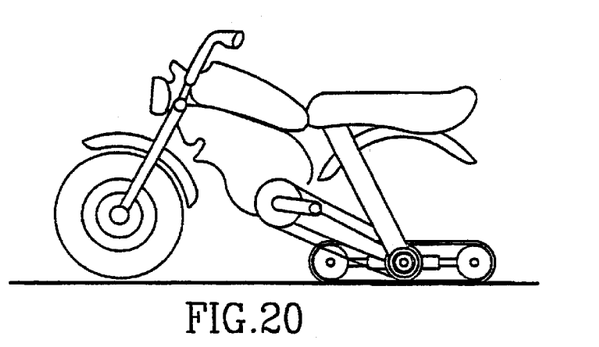
FIG. 20 shows the motorcycle of FIG. 19 with the track in a different state for transport over uneven terrains.
Figure 21:
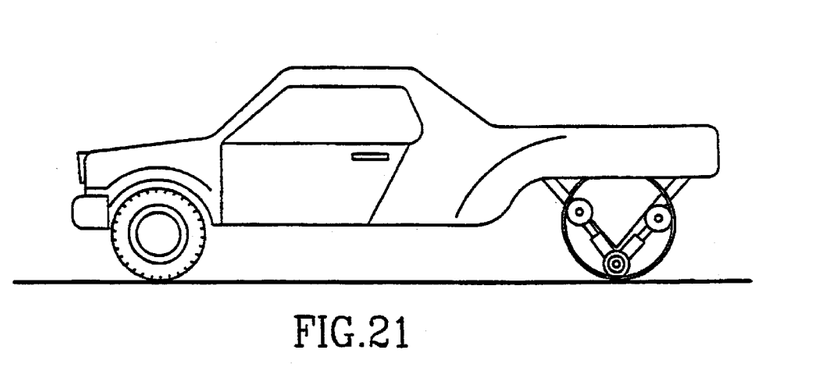
FIGS. 21 and 22 showing a four-wheel vehicle fitted with a transport mechanism in accordance with the invention in states corresponding to those of FIGS. 19 and 20, respectively.
Figure 22:
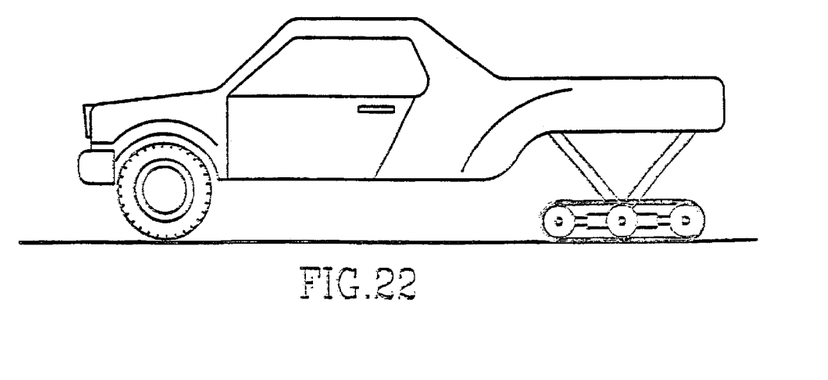

Two other types of vehicles, a motor cycle 190 and a field vehicle 192 fitted with a transport mechanism 194 and 196, respectively, in accordance with the invention, can be seen in FIGS. 19–21, each in two different states, a circular state of the track (FIG. 18 and FIG. 20) and an extended state of the track (FIGS. 19 and 21).

Figure 23:
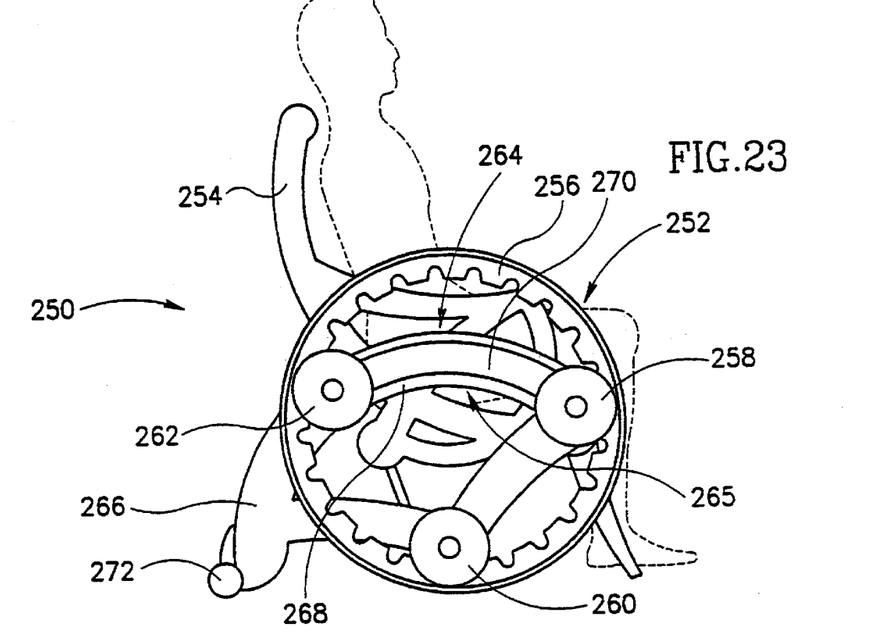
FIG. 23 is a side elevational view of a wheelchair incorporating another embodiment of a transport mechanism, with the track in its circular shape.
Figure 24:
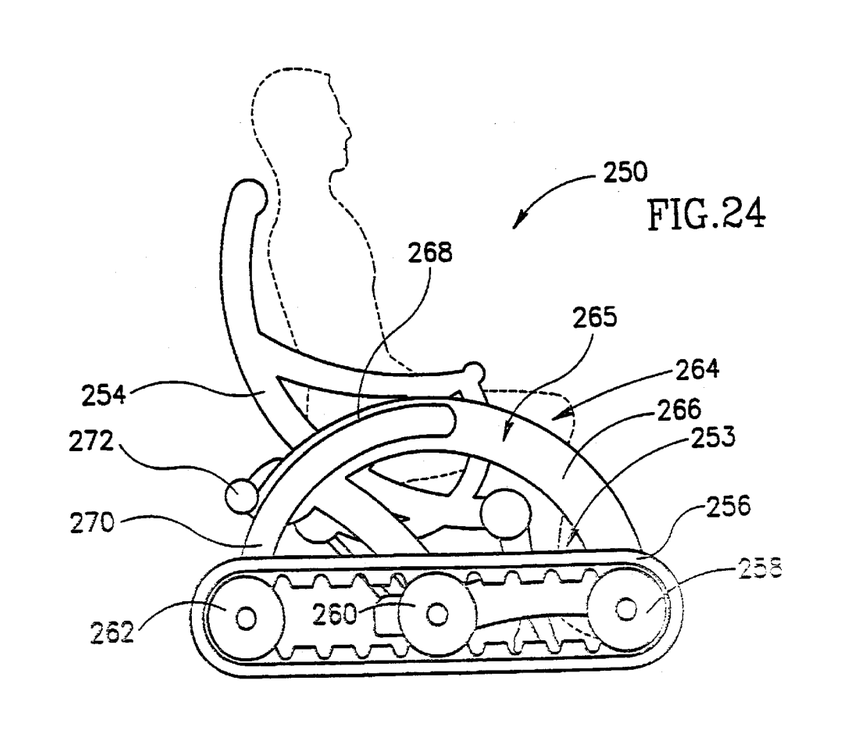
FIG. 24 shows the transport mechanism of FIG. 23 in which the track is at its extended portion.

Further attention is now directed to FIGS. 23 and 24 illustrating a wheelchair 250 generally consisting of a transport mechanism 252 and a load-bearing assembly 254 which in the present application is the seating unit of the wheelchair. The transport mechanism 252 comprises a closed track 256 supported by support rollers 258, 260 and 262, which rollers are mounted on a displacing mechanism 264.

The displacing mechanism 264 comprises a frame member 265 generally having the shape of a sector of a circle formed at its periphery element 266 with an arced rail portion 268. Roller 258 is rotatably fixed at an end of the peripheral element 266 and roller 260 is rotatably fixed at the apex of the sector-like shape frame 265. An arced rail member 270 is co-axially mounted and slidably received within the rail portion 268, with roller 262 rotatably fixed at a free end thereof. The seating unit 254 is displaceably supported by the segment-like shaped member 266 as will become apparent hereinafter.

In the position seen in FIG. 23, the arced rail member 270 is entirely received within rail portion 268, whereby the track 256 assumes its circular shape, as explained with respect to previous embodiments, whereby roller 260 bears on the track at its lowermost portion which is in touch with the ground.

In the position seen in FIG. 24, the arced rail member 270 is retracted from the arced rail portion 268 with simultaneous displacement of the frame member 265, in a clockwise direction about the axis roller 260, whereby rollers 258 and 262 become aligned with roller 260, biasing track 256 to assume a full track state, in which its contact with the ground surface is maximal and suitable for transport of the wheelchair over uneven terrains and for overcoming obstacles, typically climbing or descending a flight of stairs.

As can further be noted, the frame member 265 is fitted at its rear end with a free wheel 272 which in the position of FIG. 23 is in contact with the ground, whereas in the position of FIG. 24 it is elevated from the ground. It will further be appreciated that mutual displacement of the arced rail 270 with respect to the arced portion 268 is facilitated by an electric motor as known per se. Typically, a wheelchair in accordance with the embodiment of the present invention will be provided with a mechanism for retaining an essentially horizontal position or retaining a stable center of gravity of the seating unit, regardless of the position and inclination of the displacement mechanism as will no doubt be appreciated by the artisan.

What is claimed is:

1. A transport mechanism (104) for transporting a load-bearing assembly (102), said transport mechanism comprising:
   an endless flexible track (106) supported at an internal side thereof by at least two support rollers (108, 110), which at a first wheel-mode position one of the support rollers (108) exerts a force having a downward component on to the flexible track (106) at a point of contact thereof with a ground surface;
   intrinsic biasing means incorporated in said flexible track (106) to cause it to assume a substantially circular wheel-like shape; and
   a displacing mechanism (112) coupled to at least one of said support rollers for mutually displacing the support rollers into a second caterpillar-mode position against said biasing means in which the support rollers force the track to assume a caterpillar state in which an extended portion (122) thereof is in contact with the ground surface.

2. A transport mechanism according to claim 1, wherein at least one of the support rollers is coupled to a motor and the flexible track is engaged with said at least two support rollers for transmitting rotary motion to said track.

3. A transport mechanism according to claim 1, wherein the flexible track 106 is made of a resilient material with stiff and springy reinforcement wire embedded therein for biasing the flexible track to assume its substantially circular shape.

4. A transport mechanism according to claim 1, wherein the flexible track 106 is made of a resilient material with stiff radial projections from the internal side of the flexible track, each of the projections being connected to adjacent projections by resilient linking elements for biasing the flexible track to assume its substantially circular shape.

5. A transport mechanism according to claim 4, wherein the track 180 consists of a plurality of segments 182 pivotally connected to one another.

6. A transport mechanism according to claim 1, wherein a first 134 of the at least two support rollers is mounted at an end of a first arm 140 and a second 136 of the at least two support rollers is mounted at an end of a second arm 142 displaceable with respect to the first arm 140; whereby at a first state said support rollers 134,136 are positioned at opposite ends of a line defining the diameter of the circular shape, and at the second state both of said support rollers 134,136 are in contact with the track at a position thereof which contacts the ground.

7. A transport mechanism according to claim 1, wherein the support rollers are connected to the load bearing assembly via the displacing mechanism 132,252.

8. A transport mechanism 252 according to claim 7, wherein the load bearing assembly 254 is angularly displaceable with respect to the displacing mechanism 264 responsive to position and inclination of the flexible track 256 so as to retain a stable center of gravity.

9. A transport mechanism according to claim 1, wherein the load bearing assembly 254 comprises a mechanism 264 for maintaining it at an essentially horizontal position, regardless of the position and inclination of the flexible track.

10. A wheelchair 250 comprising a transport mechanism 252 according to claim 1, with the load bearing assembly being a seating unit 254.

11. A transport mechanism according to claim 1, for use in a load transporting device or vehicle.

12. A transport mechanism according to claim 1, wherein the flexible track 180 consists of two sets of identical links 190,192, each link having a first 194 and a second face 196, a first 198 and second 200' radial edge, a peripheral edge 202 forming part of the track's periphery and an internal edge 204; the links of each set being arranged in a closed path with the first radial edge 198' of each link facing and being adjacent the second radial edge 200 of an adjacent link, and with the first faces 194 of links of one set facing the first faces 194' of links of the other set; each link of one set being pivotally linked at a first corner thereof defined by the first radial edge 198 and by the peripheral edge with the first corner of one link of the second set, and pivotally linked at a second corner thereof, defined by the second radial edge 200 and by the internal edge, with the second corner of a link of the other set adjacent said one link; there being a biasing member 226 biasing each link to converge with respect to the adjacent links.

13. A transport mechanism according to claim 1, wherein the flexible track 150 consists of a plurality of identical segments 152 connected to one another by links 154; each segment having a peripheral edge forming part of the track's periphery, an internal edge and two side edges, the side edges being inclined such that when the track assumes its circular shape, side edges of adjacent segments are in contact with one another; the segment being connected to the links at corners formed between the peripheral and side edges in a slidable and pivotal manner; the track comprising one or more biasing members 160 biasing segments 152 towards one another.

14. A transport mechanism according to claim 1, wherein one of the support rollers 258 is mounted on a first arced rail 266 and another of the support rollers 262 is mounted on a second arced rail 270 co-axial with the first arced rail 266, said arced rails being mutually slidably displaceable with respect to one another so as to displace the respective support rollers between the first and second positions.

* * * * *